United States Patent Office 3,475,000
Patented Oct. 28, 1969

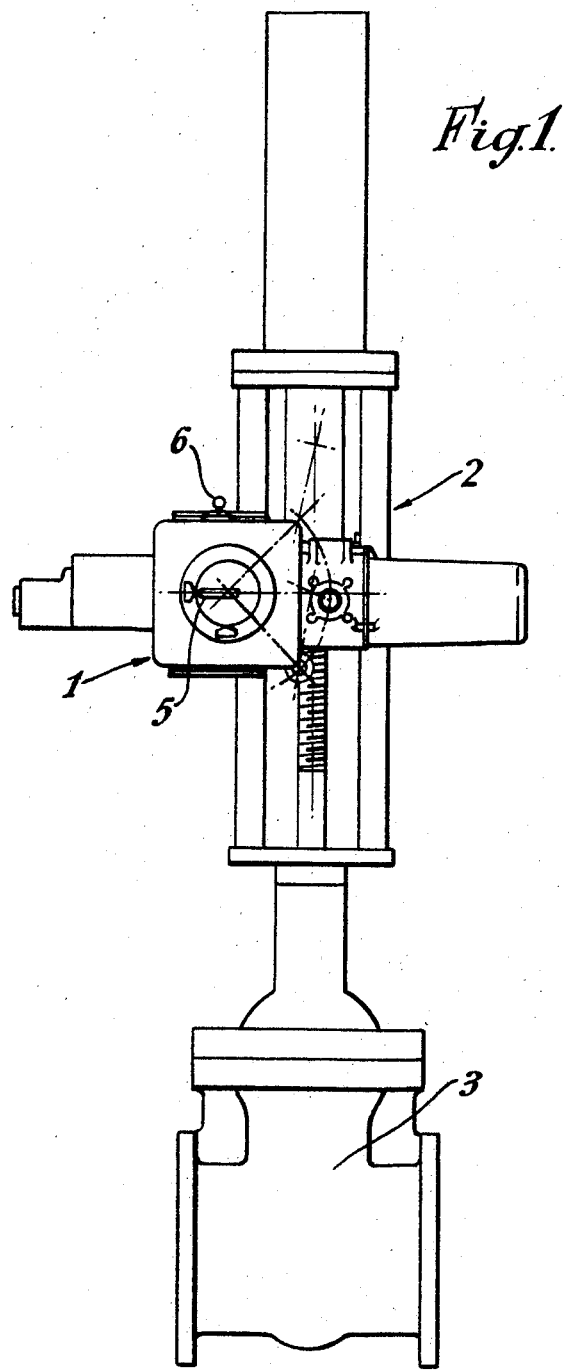

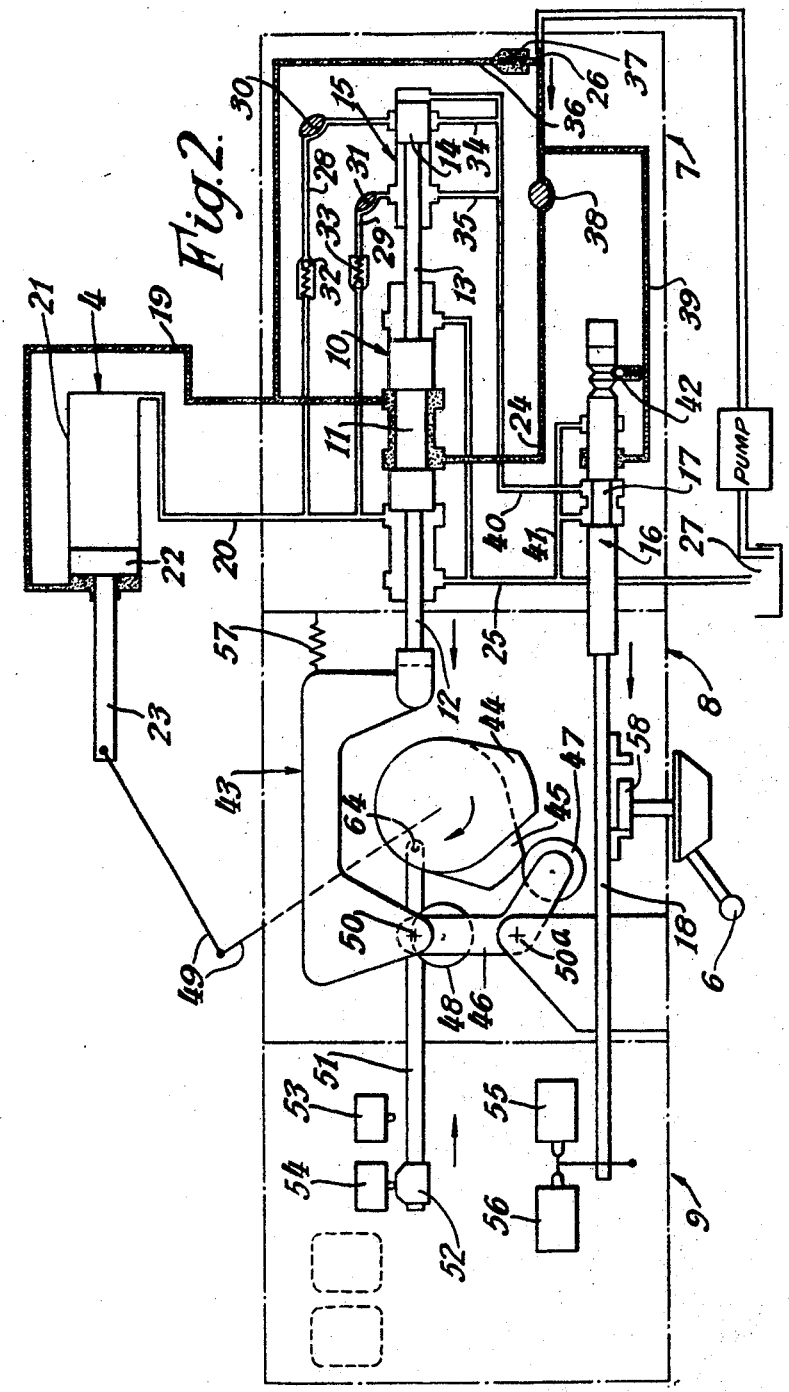

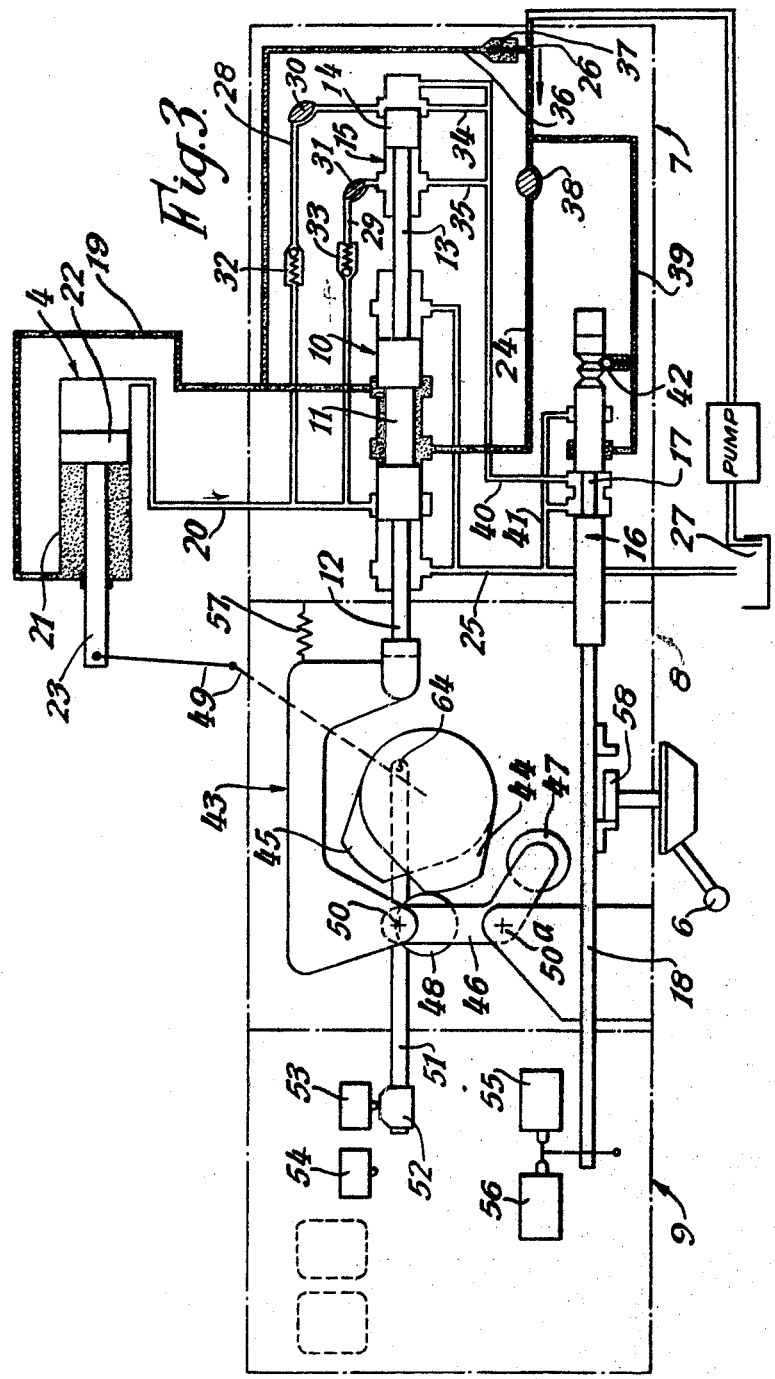

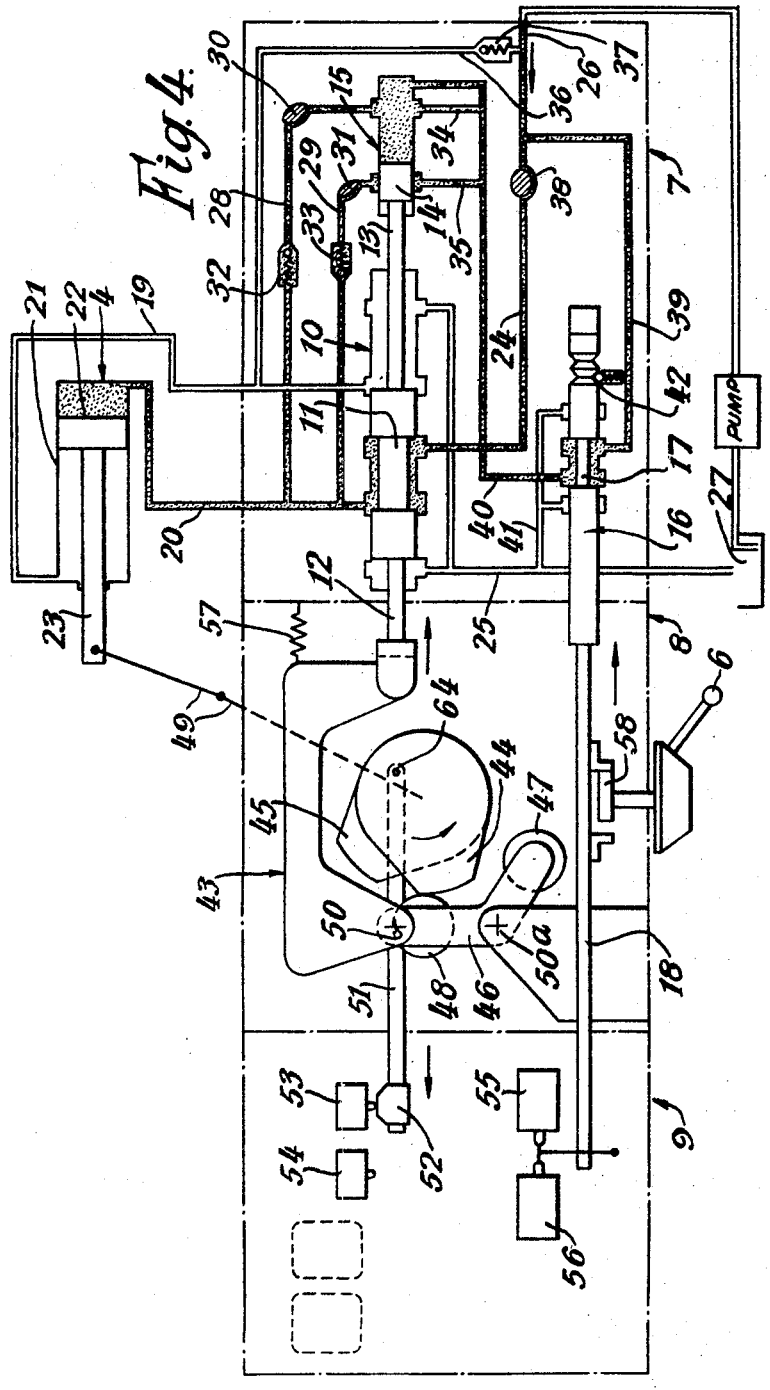

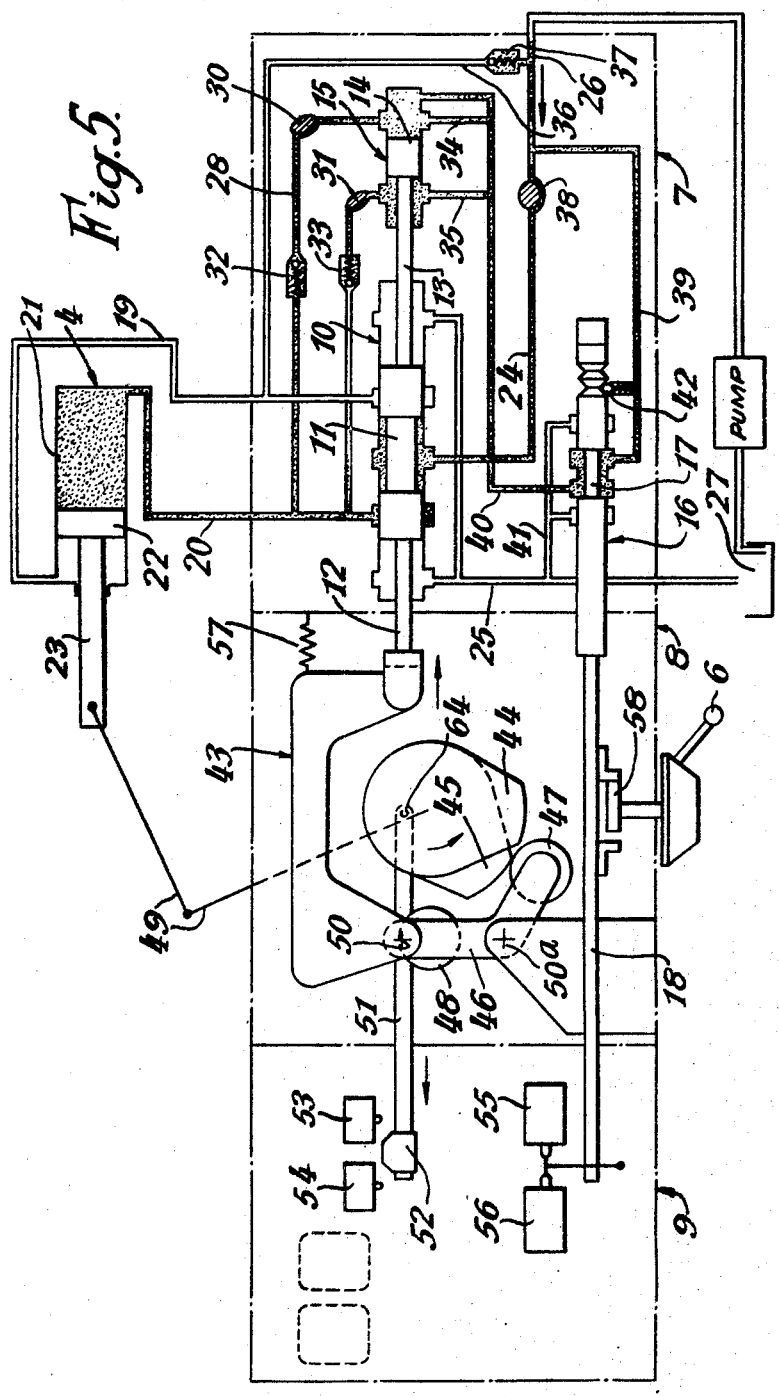

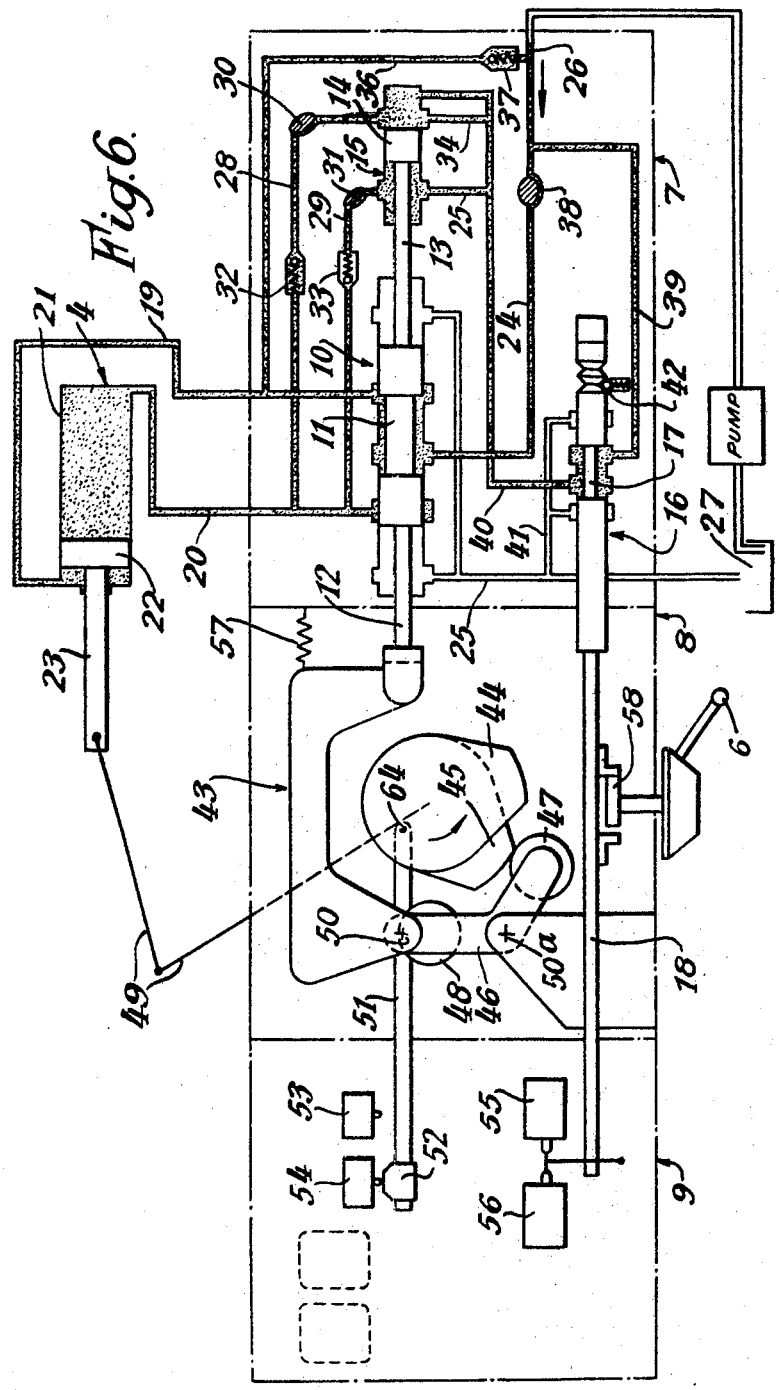

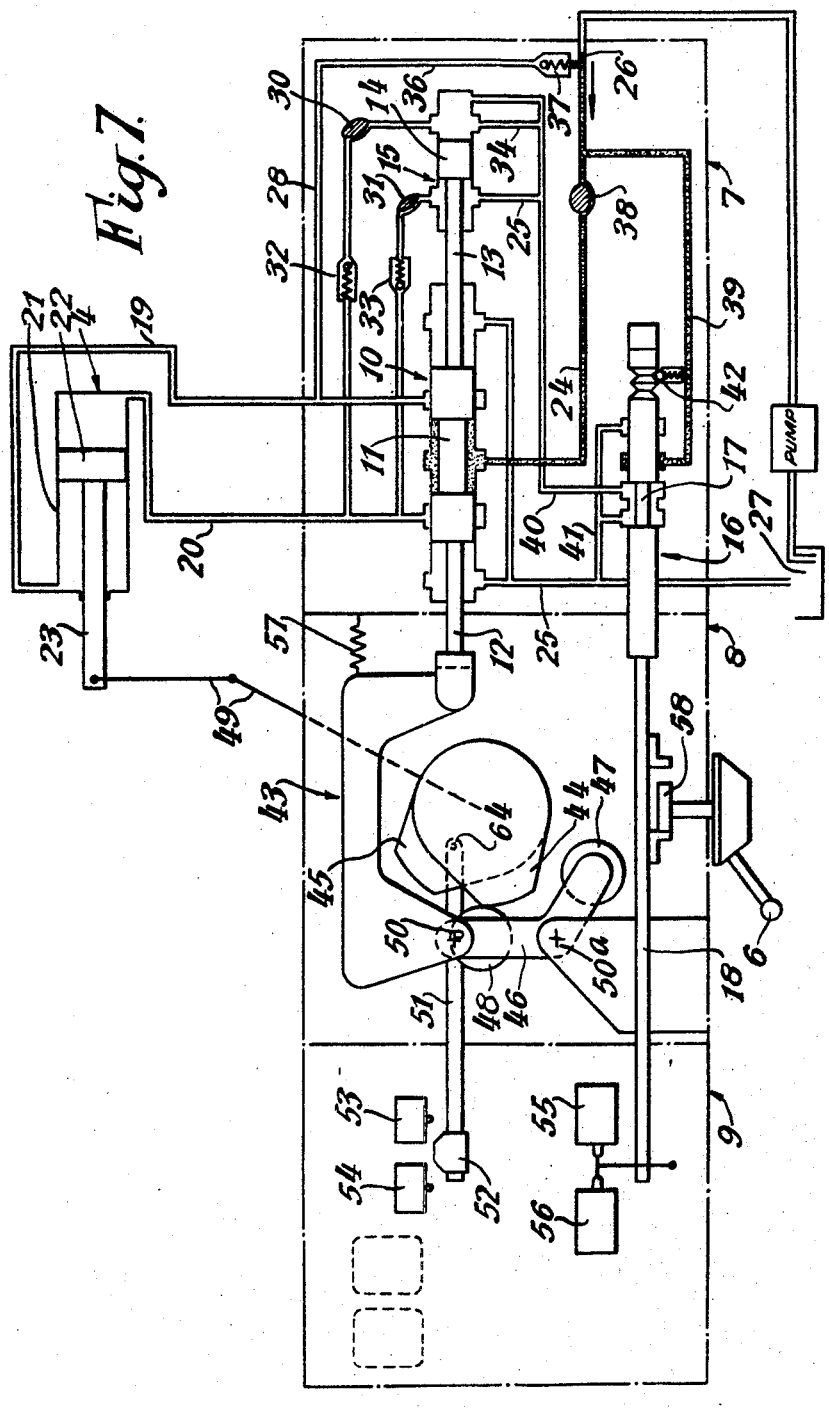

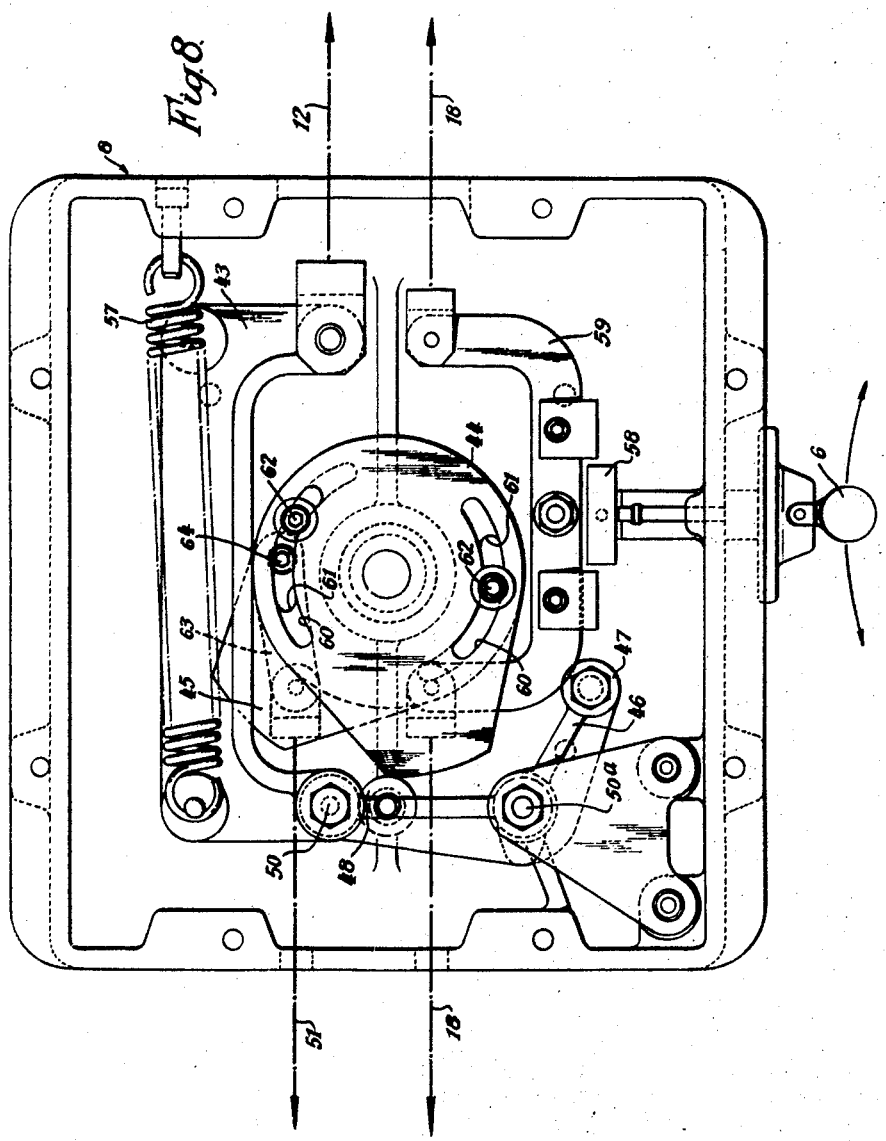

3,475,000
HYDRAULIC ACTUATORS AND CONTROL
SYSTEMS THEREFOR
Jeremy J. Fry and Donald L. Hore, Bath, and Peter T. M. Nott, Leigh-on-Sea, Essex, England, assignors to Rotork Engineering Company Limited, Bath, Somerset, England
Filed Oct. 31, 1966, Ser. No. 590,767
Int. Cl. F16k 31/12, 15/18, 5/04
U.S. Cl. 251—30    7 Claims

ABSTRACT OF THE DISCLOSURE

A control system for quickly opening and closing a valve, with reduced speed during final opening and closing, by a hydraulic actuator comprising interconnected main and speed control valves. A cam feedback mechanism from the valve controls movement of the main and speed control valves to instigate determined flow of hydraulic fluid. Electrical and manual means are provided to energize the system for the opening and closing operations.

---

The control system forming the subject of the present invention has been designed for use with and for controlling the operation of a double acting piston and cylinder type hydraulic actuator intended primarily for operating a valve in a pipeline in an opening and closing sense and particularly a pipeline used for the supply of products where a quick opening and closing movement of the valve is required to avoid product wastage.

Usually such valves are of the wedge gate type, but the present invention is equally applicable for the controlled operation of other types of valves, such as through-conduit slab gate valves, ball and plug valves or butterfly valves.

The use of conventional actuators for operating valves in supply pipelines as mentioned above presents a problem as the high operating speeds necessarily means that the horsepower requirements for each valve is many times that used for normal valve operation.

An electric actuator in a conventional form is therefore unsatisfactory as the excessive size of the motor required to meet the horsepower requirement would not only have the disadvantage of high initial cost, but in operation could result in damage to the valve and/or actuator.

Hydraulic actuators on the other hand have the advantage of using a reduced horsepower and high variable speed operation and the chief object of the invention is to evolve an improved control system for a hydraulic actuator of the double acting piston and cylinder type, which furthermore can be manually or automatically operated and which provides for the accurate control of the output speed and position.

A still further object of the invention is to provide an electrically operated control system for the hydraulic actuator in which the various electrical components are all housed in a weatherproofed casing or container also designed to comply with existing regulations regarding flameproofing.

A control system in accordance with the present invention for a hydraulic actuator of the double acting piston and cylinder type comprises a main control valve controlling the flow of hydraulic fluid to and from the opposite ends of the cylinder of the hydraulic actuator, a speed control valve connected with the main control valve to move therewith and control the speed of movement of the piston in the hydraulic actuator, a pilot valve controlling the flow of hydraulic fluid to and from the main control valve for instigating movement of the piston of the hydraulic actuator in conjunction with the adjustable flow restrictors and non-return valves, said pilot valve being movable by manual and/or remote control means, and feed back mechanism operable by the valve in the pipeline or other device movable by the hydraulic actuator for feeding back movement of the pipeline valve or other device to the main control valve and speed control valve to vary the speed of movement of the hydraulic actuator piston and the pipeline valve or other device moved by the hydraulic actuator.

The pilot valve may be operated electrically from a remote location or by means of a manually operated control member on the controlling device to provide a manual override control to provide for maintenance of the controlling device, valve and actuator.

The control system in accordance with the present invention preferably takes the form of a self-contained unit which can be attached directly or indirectly to the valve which it is intended to control, the control system being therefore suitable without alteration or substantial alteration for use with valves of various types.

According to a further feature of the invention the unit includes means whereby the control mechanism can be adjusted "on site" to provide the opening and closing speed necessary for a particular valve installation.

Referring to the accompanying drawings:

FIGURE 1 shows a hydraulic control unit in accordance with the invention mounted on a hydraulically operated wedge gate valve;

FIGURES 2 to 7 illustrate schematically the operation of the hydraulic control unit; and FIGURE 8 is a view showing the components of the mechanical assembly.

Referring in the first case to FIGURE 1 of the accompanying drawings the hydraulic control unit in accordance with the invention and indicated generally by reference numeral 1 is shown fitted by way of example to a casing 2 associated with a wedge gate valve 3, the casing 2 containing or having associated with it a double acting piston and cylinder type hydraulic actuator diagrammatically represented at 4 in FIGURES 2 to 7. The hydraulic control unit is fitted with an indicator 5 showing the position of the valve and a manually operated override control lever 6 later referred to in the ensuing description.

The hydraulic control unit comprises three sub-units bolted or otherwise connected together, namely a valve block generally indicated by reference numeral 7, a mechanical assembly 8 and an electrical assembly 9.

The valve block 7 contains a main control valve 10 of the sliding spool four-way type having fixed end travel positions but with variable positioning therebetween. The main spool 11 has an extension 12 into the mechanical assembly sub-unit 8 and a further extension 13 at its opposite end to the spool 14 of a speed control valve 15 of the four-way type. Consequently the spools of the main control valve and speed control valve move together during operation of the control mechanism.

The valve block 7 also contains a pilot valve 16 of the three-way type the spool 17 of which has an extension 18 passing through the mechanical assembly sub-unit 8 and into the electrical assembly sub-unit 9.

The main control valve 10 has outlets 19 and 20 leading to opposite ends of the cylinder 21 of the hydraulic actuator 4, the cylinder 21 containing a piston 22 fitted with a piston rod 23.

The main control valve has two further outlets 24 and 25 leading respectively to the hydraulic fluid supply 26 and to a reservoir 27.

The speed control valve 15 has outlets 28 and 29 both leading to one end of the hydraulic actuator cylinder 21 and containing restrictors 30 and 31 and non-return valves 32 and 33. The speed control valve has two further outlets 34 and 35 both leading to the pilot valve 16.

Outlet 19 has a branch pipe 36 leading back to the source of hydraulic pressure 26 via a non-return valve 37. Outlet 24 contains a further restrictor 38.

The pilot control valve has outlets 39, 40 and 41 leading respectively to the source of fluid supply, speed control valve and reservoir. The spool of the pilot valve is maintained in either of two positions by a spring-urged ball 42.

The remaining pipe connections shown are merely for maintaining the system primed with hydraulic fluid and for drainage purposes.

The mechanical assembly sub-unit 8 contains a link diagrammatically indicated by reference numeral 43 connected with extension 12 of the main control valve 10, two angularly adjustable cams 44 and 45 and a bell-crank lever 46 fitted with rollers 47 and 48. The two cams 44 and 45 are associated directly or indirectly with the valve which is to be controlled and provide a feedback. The valve is opened and closed by the piston rod 23 of the hydraulic actuator and the feedback operated by a linkage diagrammatically indicated by reference numeral 49. The bell-crank lever 46 is pivotally connected at 50 to the link 43 and is pivotally mounted at 50a.

Link 43 has an extension 51 carrying a cam 52 operating limit switches 53 and 54. Extension 18 of the pilot valve leads to two solenoids 55 and 56, the limit switches and solenoids being contained in the electrical assembly sub-unit 9 which contains all the electrical mechanism in a flame-proof manner.

The two cams 44 and 45 operate against one or the other of the rollers, one for each direction of rotation i.e. one cam operates during opening movement of the valve and the other during closing movement, the angular positioning of the valve being manually adjustable in the manner described later in connection with FIGURE 8.

A spring 57 is provided for maintaining contact between the rollers and cams and for returning the main control valve to its initial position.

The pilot valve is moved electrically from, for example, a remote point by means of solenoids 55 and 56 but an over-riding manual control lever 6 is provided driving a cam 58 in operative connection with extension 18 by which the pilot valve can be moved manually if required at any time.

The two limit switches 53 and 54 actuated by the cam 52 control the energization of the two solenoids 55 and 56 and thus actuate the pilot valve according to the position of the valve in the pipeline in an opening or closing sense and in a manner hereinafter described.

The two cams 44 and 45 and their associated parts are more clearly illustrated in FIGURE 8. It will be seen that extension 18 is divided by a link 59, the two cams 44 and 45 being formed with slots 60 and 61 for the reception of locking screws 62, extension 51 being connected with the cams by a further link 63 secured to the cams in an adjustable manner by a locking screw 64.

The operation of the unit in opening and closing a valve in a pipeline will now be described with reference to FIGURES 2 to 7.

FIGURE 6 shows the position of the parts when the valve is virtually closed, pressure fluid acting on both sides of the piston 22 of the hydraulic actuator, the piston being urged to the left-hand end of the cylinder and maintained in that position due to the working area on the right-hand side of the piston being the greater.

Assuming therefore that it is desired to open the valve the hand lever 6 is moved to the left as in FIGURE 2 to the "open" position or the "open" solenoid energized, either operation resulting in movement of the spool of the pilot valve 16 to the left into the position shown in FIGURE 2 which allows the right-hand side of piston 14 to be connected to reservoir 27 through pipelines 40, 41 and 25. The spring 57 then moves the main valve spool 11 to the right connecting the right-hand end of the actuator cylinder 21 to the reservoir 27 through the pipelines 20 and 25 thus initiating action of the actuator piston to the righ and opening movement of the pipeline valve.

It is desired that the valve shall have a fast opening movement and the movement of the pilot valve spool 17 to the left will allow the pressure on the right-hand side of the main valve spool to drain to the reservoir and the spring 57 will pull the linkage 43 to the right moving the main valve spool into the position shown in FIGURE 2, which allows full pressure from the fluid supply source to be applied to the left-hand face of piston 22 resulting in a fast opening movement of the pipeline valve. At the same time the opening movement will be communicated to cams 44 and 45, the cams rotating in a clockwise direction.

At the same time the cam 52 will move clear of the "close" limit switch 54 and move towards the "open" limit switch 53.

Further rotation of the cams will cause cam 44 to engage roller 48 thus moving the spool 11 of the main valve into the position shown in FIGURE 3 in which the main return flow of hydraulic fluid from the right-hand end of the cylinder is shut off. Fluid can then only return to the reservoir via pipelines 20, 29, restrictor 31, speed control valve and pipelines 35, 40 and 41 the return flow and movement of the actuator piston being therefore considerably restricted. This ensures that the pipeline valve shall reach the end of its travel accurately without overrun, the load on the actuator piston being considerably reduced with the result that the process of deceleration will not necessitate the absorption of considerable energy. The cam 52 at the termination of movement of the pipeline valve operates the limit switch 53 to de-energize the "open" solenoid to prevent it from being damaged since the solenoids are energized continuously during operation and are controlled by a change-over switch at the control station.

In FIGURE 4 the manually operated lever 6 has been moved to the right to the "close" position. This movement or energization of the "close" solenoid moves the pilot valve to the right as in FIGURE 4 thus connecting the pressure supply with the right-hand end of the actuator cylinder so that the full pressure available can act on the right-hand side of the actuator piston to cause a quick closing movement. The pressure fluid can in this case pass through pipelines 24 and 20 and restrictor 38 and also through pipelines 39, 40, 34, 28 and 20 and restrictor 30. The spool 11 is moved completely to the left under pressure behind piston 14, which is greater than the force of spring 57. As the cam 45 is turned by the rotary movement of the valve to act on roller 47, this gradually moves spool 11 to the right against the pilot pressure acting on spool 14.

The actuator piston then moves to the left to close the pipeline valve and the cams move in an anti-clockwise direction to disengage the cam 52 from limit switch 53, the spool of the main valve being moved to the right as in FIGURE 5 as the pipeline valve approaches the closed position when a speed reduction again occurs due to the main fluid supply to the actuator cylinder and the return to reservoir being cut off, the fluid then necessarily having to flow through pipelines 39, 40, 34, 28 and 20 and restrictor 30 the return being redirected through pipes 19 and 36 and non-return valve 37 to the main supply. This flow will be at a higher pressure from the left-hand side of the cylinder and will thus be able to overcome the non-return valve, and flow into the main supply line.

As the pipeline valve continues to close, the spool of the main valve continues to move to the right until a small flow is directed to the left-hand end of the cylinder as shown in FIGURE 6. In this case, as previously explained, both sides of the piston will be subjected to fluid at the normal working pressure, the thrust on the right-hand side of the piston being the greater due to it having the larger working area. The pipeline valve continues to close as a result of this differential pressure, this feature allowing a greater thrust to be available for opening the pipeline valve than was available for closing because the final closing was effectively using only the area of the piston rod whilst the full annular area is available for opening.

At the end of the closing action the cam 52 actuates limit switch 54 to de-energize the "close" solenoid.

In FIGURE 7 an arrangement is shown involving an increase in the diameter of the roller 48 which results in the feedback cams so positioning the spool of the main valve that the supply and return to the actuator cylinder is cut off and the spool is held in position by the pressure supply. The actuator piston is thus locked in position and will hold the pipeline valve in the required position.

It will be appreciated that the control system and hydraulic actuator as described above provides an arrangement whereby an accurate positioning of the output member and thereby the valve can be obtained as the output movement is fed back to the main control valve. Furthermore the use of the position feedback mechanism provides for deceleration of the output member when approaching the preset end positions so that the main control valve starts to close before this position is reached. At the final end positions the valve is maintained sealed or positioned by a reduced sealing pressure. The control system although normally operable automatically from a remote location is also provided with a manual operating lever by the valve which can be located in any one of three positions. Finally the electrical control unit forming part of the system is designed as a weatherproof and flameproof enclosure. The control unit contains all the electrical components so that the electrical control system can be applied to any particular form of hydraulic actuator.

We claim:

1. A control system for a hydraulic actuator of the double acting piston and cylinder type and used to control devices such as pipeline valves comprising a main control valve controlling the flow of hydraulic fluid to and from the opposite ends of the cylinder of the hydraulic actuator, a speed control valve connected with the main control valve to move therewith and control the speed of movement of the piston in the hydraulic actuator, a pilot valve controlling the flow of hydraulic fluid to and from the main control valve for instigating movement of the piston of the hydraulic actuator, adjustable flow restrictors and non-return valves operably mounted in said system to act in conjunction with said pilot valve, manual means and remote control means individually actuatable to move said pilot valve, and feed back mechanism operable by the controlled device and movable by the hydraulic actuator for feeding back movement of said device to the main control valve and speed control valve to vary the speed of movement of the hydraulic actuator piston and the device moved by the hydraulic actuator.

2. A control system as claimed in claim 1 wherein the feedback mechanism comprises two cams angularly movable jointly about a common axis, a link connected to the spools of said main and speed control valves, a pivotally mounted bell-crank lever having rollers on each end thereof to cooperate with said link to impart linear movement to the main control valve and speed control valve.

3. A control system as claimed in claim 2 wherein the two cams are individually angularly adjustable about their axes to control the point in the movement of the pipeline valve at which its speed of movement is reduced prior to reaching its fully open and fully closed positions.

4. A control system as claimed in claim 2 further comprising two solenoids operatively connected for moving the pilot valve in either direction, the feed back mechanism further comprises an extension and limit switches actuated by said extension and operatively connected to control the energization of said two solenoids.

5. A control system as claimed in claim 1 in which said remote control means are electrically operated from a remote point and said manual means comprises an overriding hand control lever.

6. A control system as claimed in claim 1 further comprising a supply of hydraulic fluid to the actuator which applies a differential pressure to the piston in the cylinder of the actuator when the pipeline valve is in its closed position thus maintaining the valve firmly closed.

7. A control system for controlling the movement of a wedge gate or other type of valve in a pipe in the opening and closing sense and providing a quick opening and closing movement with a reduction in speed during the final opening and closing movement, said opening and closing movement being effected by a hydraulic actuator, said control system comprising interconnected four-way sliding spool main and speed control valves, a cam type feed back mechanism actuated by the pipeline valve and controlling the endwise sliding movement of the main and speed control spools, a three-way sliding spool type pilot valve for instigating the flow and return of hydraulic fluid to and from the actuator, solenoids for moving said pilot valve into either of two positions, switching means actuated by the feed back mechanism controlling the energization of the solenoids and the position of the pilot valve spool and restrictors in the hydraulic circuit restricting the flow of hydraulic fluid to the actuator during the final opening and closing movement of the pipeline valve to reduce the speed of the moving component of the hydraulic actuator near the end of its movement.

References Cited

UNITED STATES PATENTS

| 2,783,742 | 3/1957 | Shafer | 91—407 |
| 2,812,774 | 11/1957 | Anderson et al. | 251—31 X |
| 2,830,785 | 4/1958 | Buri | 251—31 X |
| 2,896,582 | 7/1959 | Justice | 91—407 |
| 3,283,669 | 11/1966 | Lissau | 91—461 X |

ARNOLD ROSENTHAL, Primary Examiner

U.S. Cl. X.R.

91—407, 410; 251—31